United States Patent
Nayshtut et al.

(10) Patent No.: US 10,826,877 B2
(45) Date of Patent: *Nov. 3, 2020

(54) SECURE SERVICE MATCHING

(71) Applicant: McAfee, LLC, San Jose, CA (US)

(72) Inventors: Alex Nayshtut, Gan Yavne (IL); Oleg Pogorelik, Lapid (IL); Omer Ben-Shalom, Rishon Le-Tzion (IL); Igor Muttik, Berkhamsted (GB)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,392

(22) Filed: Dec. 3, 2018

(65) Prior Publication Data

US 2019/0104116 A1    Apr. 4, 2019

Related U.S. Application Data

(63) Continuation of application No. 14/865,430, filed on Sep. 25, 2015, now Pat. No. 10,148,624.

(51) Int. Cl.
*H04L 29/06* (2006.01)
*G06F 21/57* (2013.01)
*G06F 21/62* (2013.01)

(52) U.S. Cl.
CPC .......... *H04L 63/0428* (2013.01); *G06F 21/57* (2013.01); *G06F 21/6245* (2013.01);
(Continued)

(58) Field of Classification Search
CPC ............... H04L 63/0428; H04L 63/062; H04L 63/0853; H04L 63/1441; G06F 21/57; G06F 21/6245
See application file for complete search history.

(56) References Cited

U.S. PATENT DOCUMENTS 5,987,610 A    11/1999 Franczek et al.
6,073,142 A    6/2000 Geiger et al.
(Continued)

FOREIGN PATENT DOCUMENTS

WO    2017052943 A1    3/2017

OTHER PUBLICATIONS

International Preliminary Report on Patentability issued in PCT Application No. PCT/US2016/048505 dated Apr. 5, 2018; 8 pages.
(Continued)

*Primary Examiner* — Ayoub Alata
(74) *Attorney, Agent, or Firm* — Patent Capital Group

(57) ABSTRACT

There is disclosed in one example a computing apparatus to broker purchase of an item or service between a consumer and seller, including: a hardware platform including a processor; and a memory, including executable instructions to instruct the hardware platform to: receive an encrypted payload including a request from a consumer to purchase the item or service, the encrypted payload including information about the consumer; without exposing the information about the consumer to the seller, determine, based on the seller's availability to sell the item or service and the seller's preferences for selling the item or service, that the request matches the seller's availability and preferences; and send a notification that the seller will sell the item or service.

20 Claims, 16 Drawing Sheets

(52) U.S. Cl.
CPC ........ *H04L 63/062* (2013.01); *H04L 63/0853* (2013.01); *H04L 63/1441* (2013.01)

(56) References Cited

U.S. PATENT DOCUMENTS

| | | |
|---|---|---|
| 6,460,050 B1 | 10/2002 | Pace et al. |
| 7,506,155 B1 | 3/2009 | Stewart et al. |
| 2004/0162780 A1 | 8/2004 | Booth |
| 2007/0250904 A1 | 10/2007 | Waller |
| 2009/0313077 A1 | 12/2009 | Wheeler |
| 2011/0099040 A1* | 4/2011 | Felt .................... G06Q 10/0631 705/7.12 |
| 2013/0254328 A1 | 9/2013 | Inoue et al. |
| 2013/0262273 A1 | 10/2013 | Cao |
| 2013/0290234 A1 | 10/2013 | Harris et al. |
| 2014/0066015 A1* | 3/2014 | Aissi .................... H04W 12/06 455/411 |
| 2015/0120472 A1* | 4/2015 | Aabye .................. G06Q 20/322 705/16 |
| 2017/0093803 A1 | 3/2017 | Nayshtut et al. |

OTHER PUBLICATIONS

International Search Report and Written Opinion in PCT Application No. PCT/US2016/048505 dated Dec. 1, 2016; 9 pages.
USPTO Final Office Action issued in U.S. Appl. No. 14/865,430 dated Sep. 6, 2017; 18 pages.
USPTO Non-Final Office Action issued in U.S. Appl. No. 14/865,430 dated Mar. 7, 2018; 18 pages.
USPTO Non-Final Office Action issued in U.S. Appl. No. 14/865,430 dated Mar. 9, 2017; 24 pages.
USPTO Notice of Allowance issued in U.S. Appl. No. 14/865,430 dated Jul. 30, 2018; 33 pages.

* cited by examiner

SECURE SERVICE MATCHING

CROSS-REFERENCE TO RELATED APPLICATIONS

This application is a continuation of U.S. Non-Provisional application Ser. No. 14/865,430 filed 25 Sep. 2015, titled "Secure Service Matching." The above related application is incorporated herein by reference in its entirety.

FIELD OF THE SPECIFICATION

This disclosure relates in general to the field of business intelligence, and more particularly, though not exclusively, to a system and method for secure service matching.

BACKGROUND

The internet has become a preferred means for consumers and end users to order services or goods. In a traditional transaction, a user requesting a service may make online inquiries to one or more service providers, for example by filling out a form. If one or more of those service providers is available for the service, it may then provide information to the user, who may then select from the available options.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
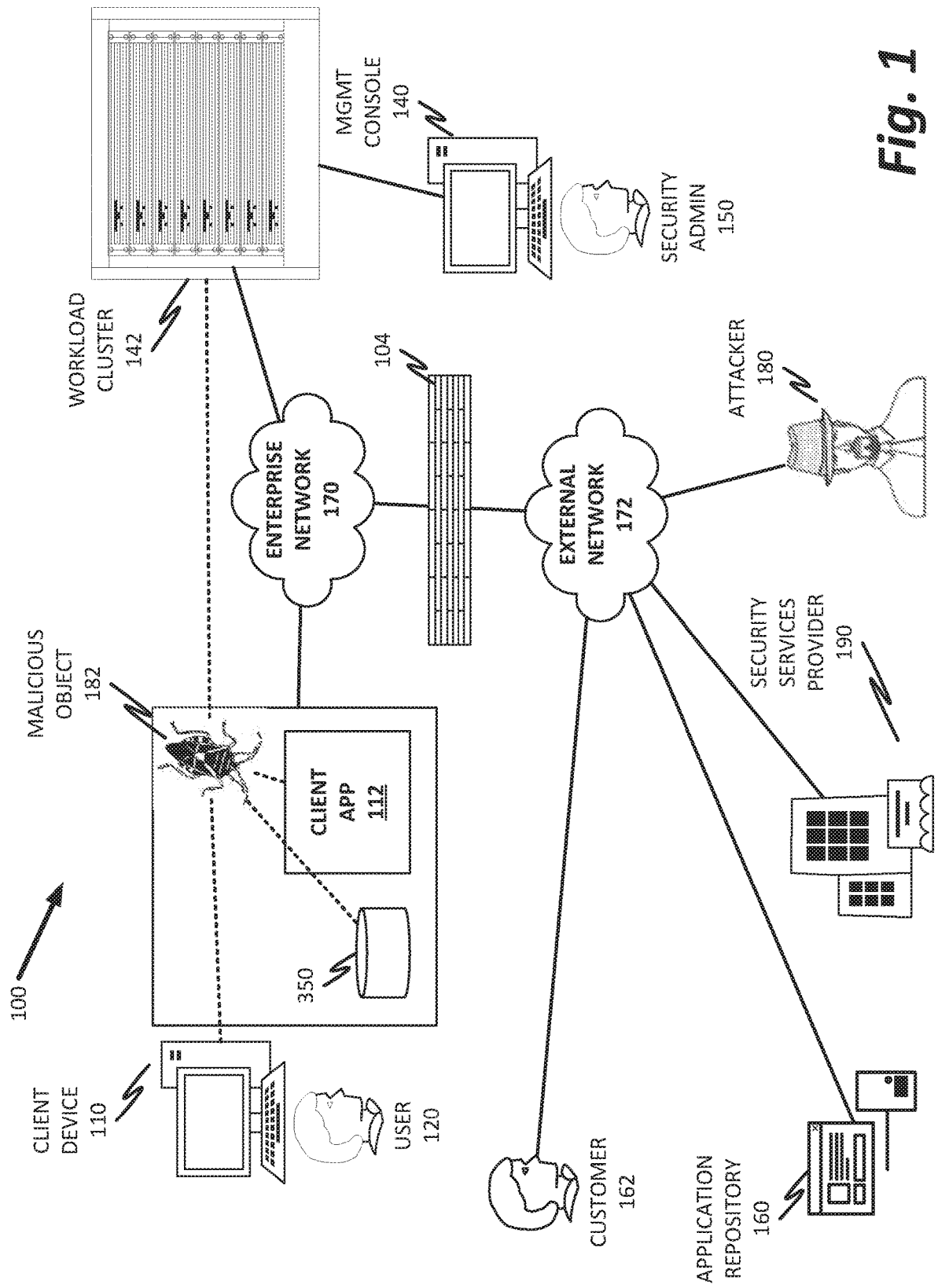
FIG. 1 is a block diagram of a security-enabled network according to one or more examples of the present specification.

In an example, there is disclosed a computing apparatus to broker purchase of an item or service between a consumer and seller, comprising: a hardware platform comprising a processor; and a memory, comprising executable instructions to instruct the hardware platform to: receive an encrypted payload comprising a request from a consumer to purchase the item or service, the encrypted payload including information about the consumer; without exposing the information about the consumer to the seller, determine, based on the seller's availability to sell the item or service and the seller's preferences for selling the item or service, that the request matches the seller's availability and preferences; and send a notification that the seller will sell the item or service.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The Applicants of the present specification have recognized that while internet-based business operations present several important opportunities and advantages for both consumers and vendors, there are also limitations that present challenges. In various parts, this specification will use the example of a customer ordering a taxi or shuttle service, though this example should be understood to be an illustration only, and is intended to be nonlimiting.

In an example, a user may wish to request a taxi. In requesting the taxi, the user may provide sensitive user data such as a name, address, telephone number, e-mail address, credit cart, or other similar data. The vendor—a taxi dispatcher, in this case—may then determine if a taxi is available, and if so, may dispatch one. However, the consumer may also want to "shop around," which may include submitting sensitive information to several different taxi services to get a quote from each one.

The danger in freely providing such sensitive information to numerous vendors is that the information may be either maliciously or negligently leaked, lost, or otherwise misappropriated. For example, a vendor may aggregate and sell its users' information to advertisers to supplement its profits. While this is not illegal, it may be a nuisance to end users. In other cases, a shady business, or a rogue employee, may deliberately misappropriate users' personal data for unethical or illegal purposes. Furthermore, if the vendor fails to properly secure the data, then even without malicious intent, the data may be exposed to hackers, crackers, or other malicious actors who wish to misappropriate data for their own illegal or unethical purposes. In yet another example, a malicious taxi driver could intercept passengers by listening in to dispatcher calls, like in the movie Night Crawler.

Thus, it is advantageous for consumers to be able to get quotes from several vendors, but protect their own privacy sufficiently that their personal data are only revealed to the vendor they ultimately select.

On the reverse side of the same transaction, a vendor may provide information about its providers so that the consumer can make a preferential selection. While this is good for the consumer, it can also present problems for the vendor. For example, the consumer may have overt or even unstated racial, gender, religious, or other biases that do not affect the quality of service, but that may unfairly sway the user's decision. In a more nefarious case, the consumer may want to deliberately target certain demographics for crime (such as for robbery, assault, or other serious crimes), and may "troll" vendors until finding a provider with a likely "mark." Thus, privacy concerns can flow the opposite direction. Such concerns may be particularly keen with certain de-centralized service providers, such as "Uber" and "Lyft," both of which provide taxi-like services via private individuals on a contract basis. Another concern may be using the information about the service provider for competitive business profiling and/or business intelligence.

Recognizing these challenges, the present specification describes one or more systems and methods for secure service matching between providers and consumers.

In one example, a consumer requests a service via a client device, such as a smart phone, equipped with a trusted execution environment (TEE), which may include for example a memory enclave accessible only via special trusted execution instructions. The smart phone sends an encrypted service request to a vendor or other service provider. When the provider receives the encrypted service request, the encrypted data are decoded only within a TEE on the provider's device. Sensitive data may not be revealed to the provider, and indeed the entire operation may be completely automated up to a point.

Within the TEE, the provider's device may decrypt the encrypted service request, and match the request against parameters (such as predefined descriptors of the service or item for sale) including contextual data and service data to determine whether the provider is available to service the request. Upon determining that the provider is available to service the request, the device sends a match notification to the consumer's device, indicating that the provider is available to service the request.

The end user may receive a plurality of such match notifications, in which case a selection must be made. Again, the TEE need not expose the match notifications to the end user. Rather, within the TEE, the match notifications are decrypted and compared to selection criteria provided in advance by the end user. A selection engine then makes an objective decision of which provider to select, based at least in part on selection criteria provided by the user. This may increase the accuracy of the selection, as well as eliminate subjective and "unfair" user interactions, which may taint results for both parties. The selection engine then sends a selection notification only to the selected vendor.

Now that the consumer and vendor have mutually selected one another, final contractual negotiations may be performed. These may include automated exchanges between the devices, or they may include personal interactions between the two parties. Only once the contract is finalized do the respective devices reveal to each party select sensitive data. These data may be less than all the data received in the encrypted service request and encrypted match notification, but rather may be only those data required for each party to carry out its part of the transaction.

A system and method for secure service matching will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a secured enterprise 100 according to one or more examples of the present specification. Secured enterprise 100 may be configured to provide services to a consumer 162 via a secure service matching method as described herein. The designation of a "consumer 162" and an "enterprise 100" is not intended to imply that a transaction according to this specification necessarily needs to be financial. Rather, it implies that "enterprise 100," acting as a service provider, provides some service that "consumer 162" consumes, in the broadest possible sense. It is expressly intended that the terms "service provider" and "consumer," as used herein, be broadly construed to include any two parties to a transaction consistent with the teachings of this specification.

In the example of FIG. 1, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources. In other cases the respective computing devices 110, 190 may be the in-car infotainment systems or wearable computing devices.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In another case, management console 140 may be provided as a web interface, on a desktop-class machine, or via a VM provisioned within workload cluster 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may also provides goods or services to a consumer 162 or other end user. Consumer 162 may operate a client device, similar to client device 110. Incident to procuring goods and services, consumer 162 may provide personally-identifying information (PII) and other private or sensitive data. Such data may be referred to throughout this specification as "sensitive user data," which term is intended to be broadly construed to include any data that user 162 does not want broadly known, disseminated, sold, or otherwise misappropriated. Secured enterprise 100 may have a privacy policy with consumer 162, or may be bound by laws or regulations that limit secured enterprise 100's use or dissemination of sensitive user data. Thus, if sensitive user data are lost, or misappropriated by a malicious actor such as attacker 180, secured enterprise may be subject to legal action, or may at least suffer loss of reputation or business value. It is therefore in secured enterprise 100's interest to properly secure sensitive user data.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and workload cluster 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 112 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "App Store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, workload cluster 142, and enterprise network 170 so as to exclude all malicious objects, and to promptly and accurately classify candidate malicious objects.

In the example of FIG. 1 consumer 162 may wish to procure (or "consume") goods, services, or any other suitable transaction provided by secured enterprise 100. Similarly, secured enterprise 100 may wish to provide those goods and services, for example, for financial gain. Thus, it is beneficial for both consumer 162 and secured enterprise 100 to complete the transaction.

However, consumer 162 and secured enterprise 100 may both be concerned about security. For example, consumer 162 may be wary of providing too much information to secured enterprise 100 before the transaction is complete, because consumer 162 is concerned that secured enterprise 100 may sell information to third parties and advertisers. This can represent a security issue for consumer 162. Consumer 162 may also be concerned that attacker 180 may breach the security of secured enterprise 100 and, for example, may install malicious objects 182 on enterprise computing resources. Attacker 180 may then harvest information provided by customers of secured enterprise 100. Attacker 180 may wish to procure these data for truly nefarious purposes.

Similarly, secured enterprise 100 may be wary of providing too much information to consumer 162 up front. For example, if secured enterprise 100 is a service that sends individual operators to consumers 162, such as a taxi service, secured enterprise 100 may be concerned about the safety of its operators. Because consumer 162 is an unknown entity, consumer 162 could be an attacker looking to lure an operator of a particular profile to attack her or him. Furthermore, secured enterprise 100 may be concerned about attacker 180 hacking into the computing network of consumer 162 and procuring information about secured enterprise 100 or individual operators thereof.

Thus, it is advantageous for both secured enterprise 100 and consumer 162 to provide only those details to one another that are necessary to complete the transaction, and to provide those details only when it is necessary to do so. Thus, one or both of secured enterprise 100 and consumer 162 may employ a system and method according to this specification to protect those data.

Further advantageously, consumer 162 and secured enterprise 100 may realize efficiency advantages from employing the systems and methods of the present specification. These advantages may include faster selection times and better selections. For example, if consumer 162 has to individually select a provider every time he orders a good or service, he may encounter inefficiencies. In essence, consumer 162 needs to remake the same decisions every time. On the other hand, if consumer 162 employs automated services, he needs only specify his preferred parameters once. Thereafter, every time he needs to order goods and services, a client device 110 can make the selection for him without seeking additional input. In some examples, a system of the present specification may even solicit feedback on choices, and incorporate that feedback into later selections.

Furthermore, consumer 162 may actually experience greater satisfaction because each selection is based on his overtly stated preferences, rather than his secret prejudices, which even he may not be aware of. For example, if consumer 162 has an unstated prejudice against operators of actual or apparent Middle Eastern descent, he may consciously or subconsciously select operators who are apparently or actually Caucasian. In some cases, those Caucasian operators may be less preferable according to consumer 162's own stated preferences then operators of Middle Eastern descent. Thus, when consumer 162 selects an operator based on actual or apparent descent, he may actually, either consciously or subconsciously, be making a sub optimal choice for his own satisfaction. By removing such unstated and usually non-useful criteria, a consumer 162 using the system and methods of the present specification may actually experience greater satisfaction.

Workload cluster 142 may provide certain centralized management features for the present specification. For example, workload cluster 142 may include a virtual machine running a service management engine, which may provide centralized availability data. For example, in the case where secured enterprise 100 is a taxi service, the service management engine may provide centralized scheduling services for a plurality of operators, as well as available routes, ranges, starting points, destinations, and so forth. In that case, client device 110 within secured enterprise 100 and a client device operated by consumer 162 may both be provided with similar service selection engines that perform similar, though not necessarily identical, selection services. The service management engine may mediate those service selections between consumer 162 and a plurality of individual operators, each of which is a user 120.

Figure 2:
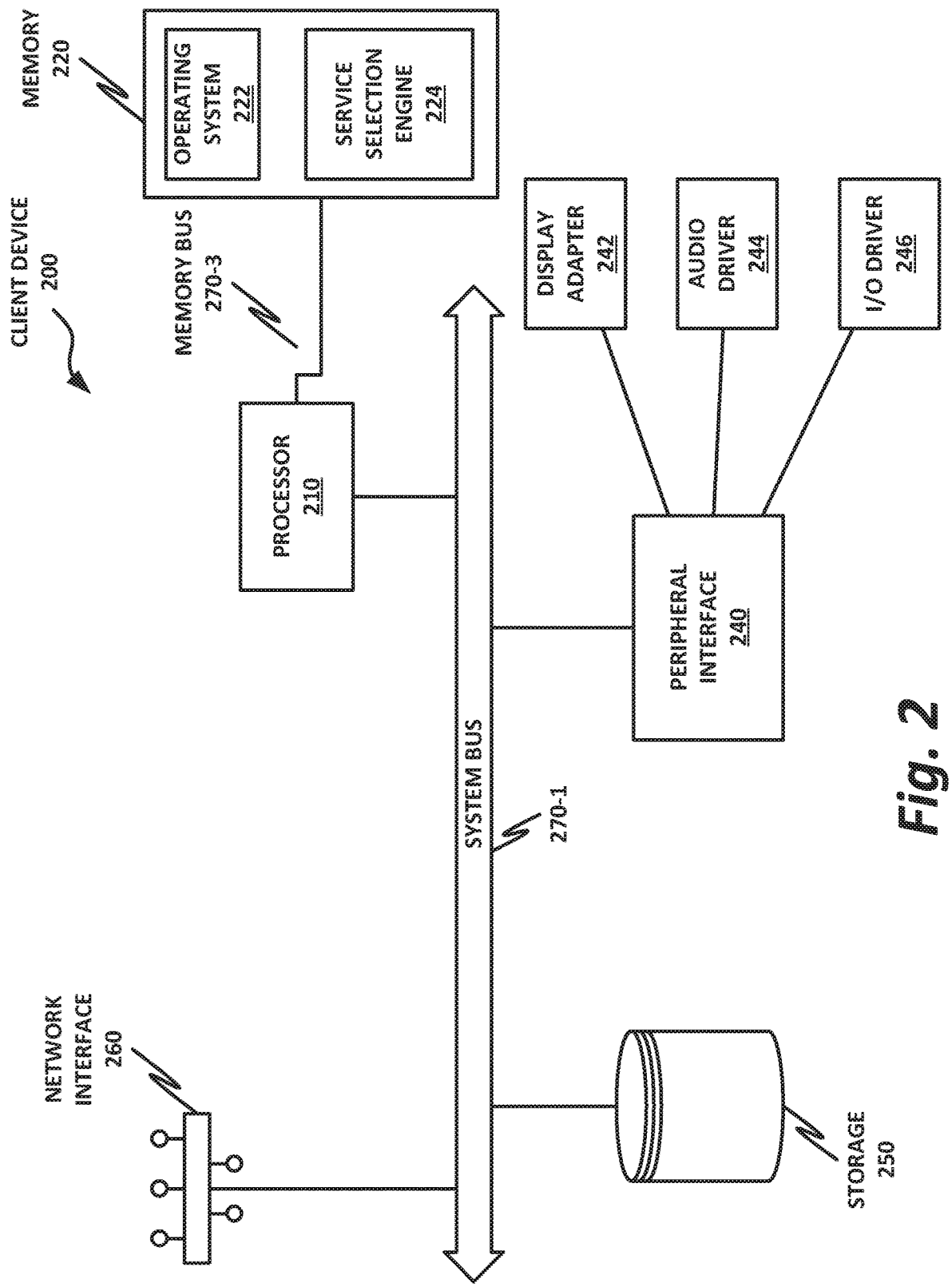
FIG. 2 is a block diagram of a computing device according to one or more examples of the present specification.

FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of computing devices 200.

Computing device 200 includes a processor 210 connected to a memory 220, having stored therein executable instructions for providing an operating system 222 and at least software portions of a service selection engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of service selection engine 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Service selection engine 224, in one example, is operable to carry out computer-implemented methods as described in this specification. Service selection engine 224 may include one or more tangible non-transitory computer-readable mediums having stored thereon executable instructions operable to instruct a processor to provide a service selection engine 224. As used throughout this specification, an "engine" includes any combination of one or more logic elements, of similar or dissimilar species, operable for and configured to perform one or more methods provided by the engine. Thus, service selection engine 224 may comprise one or more logic elements configured to provide methods as disclosed in this specification. In some cases, service selection engine 224 may include a special integrated circuit designed to carry out a method or a part thereof, and may also include software instructions operable to instruct a processor to perform the method. In some cases, service selection engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that service selection engine 224 may also include other hardware and software, including configuration files, registry entries, and interactive or user-mode software by way of non-limiting example.

In one example, service selection engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of service selection engine 224 to provide the desired method.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
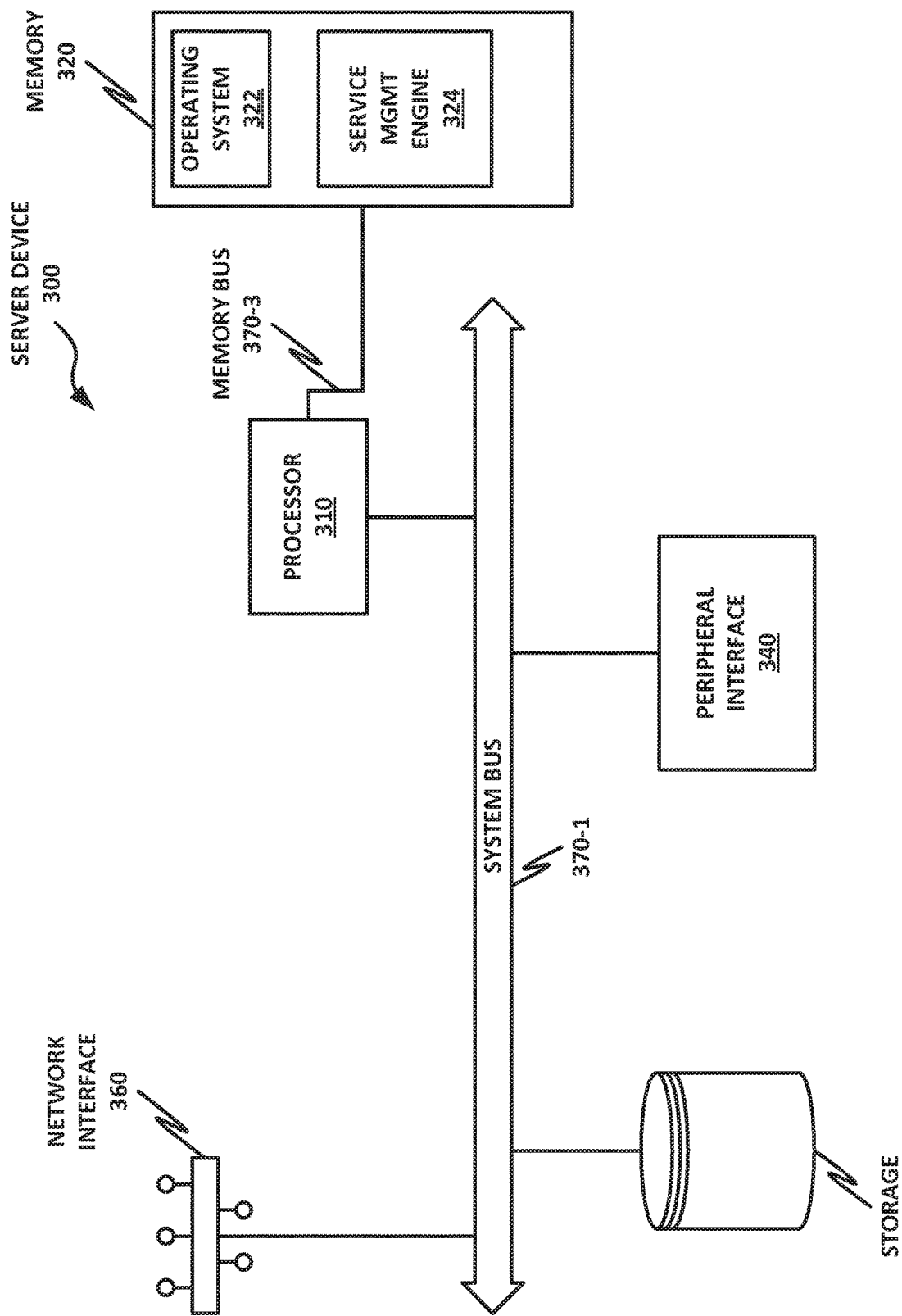
FIG. 3 is a block diagram of a server according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a service management engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of service management engine 324.

Network interface 360 may be provided to communicatively couple server 140 to a wired or wireless network, and may include one or more logic elements as described in FIG. 2.

Service management engine 324 is an engine as described in FIG. 2 and, in one example, includes one or more logic elements operable to carry out computer-implemented methods as described in this specification. Software portions of service management engine 324 may run as a daemon process.

Service management engine 324 may include one or more non-transitory computer-readable mediums having stored thereon executable instructions operable to instruct a processor to provide a security engine. At an appropriate time, such as upon booting server 140 or upon a command from operating system 322 or a user 120 or security administrator 150, processor 310 may retrieve a copy of service management engine 324 (or software portions thereof) from storage 350 and load it into memory 320. Processor 310 may then iteratively execute the instructions of service management engine 324 to provide the desired method.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users.

Figure 4:
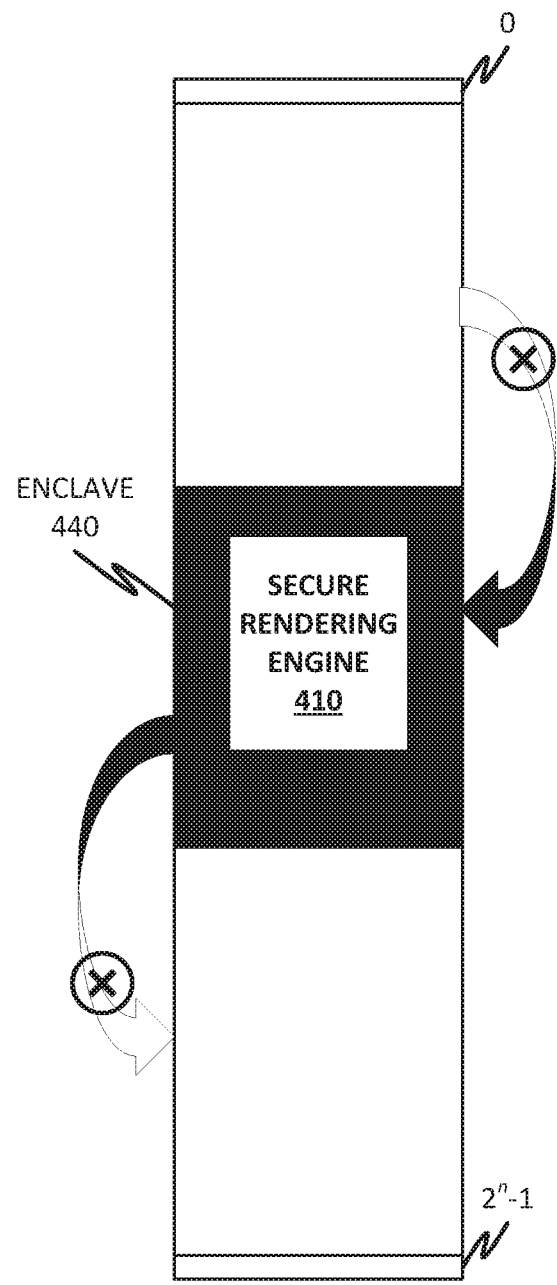
FIG. 4 is a block diagram of a trusted execution engine according to one or more examples of the present specification.

FIG. 4 is a block diagram of a memory, such as memory 220 or memory 320 disclosing with more particularity certain features in one or more examples of the present specification. In this FIGURE, memory 220 is used as a nonlimiting example.

In the example of FIG. 4, memory 220 includes enclave 440. Enclave 440 is provided as an example of a secure environment, such as a trusted execution environment (TEE) provided within memory 220. In certain systems, computing devices equipped with the Intel Software Guard Extension (SGX) instructions may be capable of providing an enclave 440. It should be noted however, that many other examples of secure environments are available, and enclave 440 is provided only as one example thereof. Other secure environments may include, by way of nonlimiting example, a virtual machine, sandbox, testbed, test machine, or other similar device or method for providing a secure environment.

In an example, enclave 440 provides a protected memory area that cannot be accessed or manipulated by ordinary computer instructions. Enclave 440 is described with particular reference to an Intel® SGX enclave by way of example, but it is intended that enclave 440 encompass any secure processing area with suitable properties, regardless of whether it is called an "enclave."

One feature of an enclave is that once an enclave region 440 of memory 220 is defined, as illustrated, a program pointer cannot enter or exit enclave 440 without the use of special enclave instructions or directives, such as those provided by Intel® SGX architecture. For example, SGX processors provide the ENCLU[EENTER], ENCLU[ERESUME], and ENCLU[EEXIT]. These are the only instructions that may legitimately enter into or exit from enclave 440.

Thus, once enclave 440 is defined in memory 220, a program executing within enclave 440 may be safely verified to not operate outside of its bounds. This security feature means that secure rendering engine 410 is verifiably local to enclave 440. Thus, when untrusted packet 120 provides its content to be rendered with secure rendering engine 410 of enclave 440, the result of the rendering is verified as secure.

Enclave 440 may also digitally sign its output, which provides a verifiable means of ensuring that content has not been tampered with or modified since being rendered by secure rendering engine 410. A digital signature provided by enclave 440 is unique to enclave 440 and is unique to the hardware of the device hosting enclave 440. Additionally, enclave 440 may provide a trusted measurement of itself for external verification of integrity and to provide assurance to client 110, user 120, consumer 162, admin 150, client app 112, or cluster 142 that the enclave operates on untampered, isolated (and therefore trusted) software. This trust indication may be submitted before receiving private data, and software 112 or 142 may decide whether it is safe to proceed with the data exchange. The indication of trust measurement may also be reported to user 120 or security administrator 150. The indication may also be used to compute the reputation of a user 120 or service provider 190 as well as to exclude them from future transactions (for example by putting them on a blacklist, temporarily or permanently, if they are deemed untrustworthy). A reputation derived from enclave 440 may be distributed to other computing devices in any suitable fashion and further used to reduce the data privacy risks.

Secure rendering engine 410 may be configured to perform either consumer-side, or provider-side management services according to this specification. A secure rendering engine 410 may also be provided on a virtual machine of workload cluster 142 to provide a service management engine 324. On a client device, secure rendering engine 410 may provide a service selection engine 224. It should be recognized that other examples are also possible.

FIGS. 5A-5G are a block diagram illustrating an example application of the teachings of the present specification. As discussed above, the concrete example of a user ordering a taxi service is used by way of illustration, although the system and methods taught herein are equally applicable to any negotiated transaction in which sensitive data must be disclosed and are preferably concealed from those on the other side of the transaction until necessary, and then only to the extent necessary.

Figure 5A:
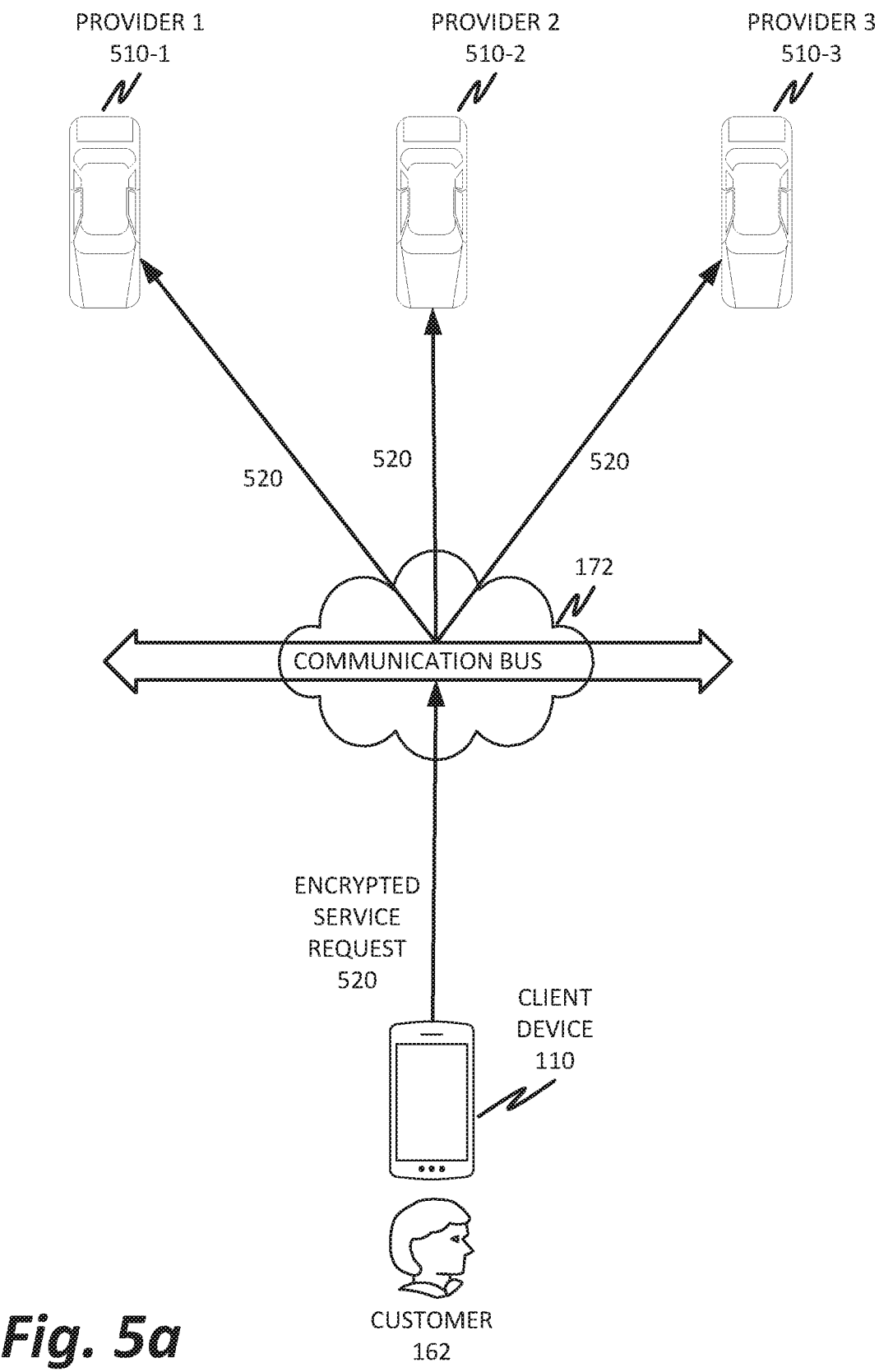
FIGS. 5A-5G are a block diagram illustrating a method of secure service matching according to one or more examples of the present specification.

In FIG. 5A, consumer 162 wishes to order a taxi at a certain time to carry him from a certain place to a certain destination. Consumer 162 does not wish to provide his personal and sensitive user data to secured enterprise 100, or to a plurality of secured enterprises 100, until necessary, and then only to the extent necessary. Thus, operating client device 110 (including a service selection engine 224), consumer 162 sends an encrypted service request 520 via communication bus 172, such as the Internet, a dedicated communication bus, or any other suitable bus, to a plurality of providers 510. As used throughout this specification, a "service request" includes any request for goods, services, real property, fixtures, financial instruments, a contract, or any other negotiated transaction or interaction compatible with the method.

Communication bus 172 broadcasts encrypted service request 520 to providers 510, such as provider 1 510-1, provider 2 510-2, and provider 3 510-3. Encrypted service request 520 is configured to be readable only by a provider operating a service selection engine 224. If other providers 510 receive encrypted service request 520, they will not be able to read or understand it. Thus, consumer 162 may provide for his security from his end, without having to trust specific providers 510 to provide a secure selection engine, because only secured operators can use and interpret encrypted service request 520.

Figure 5B:
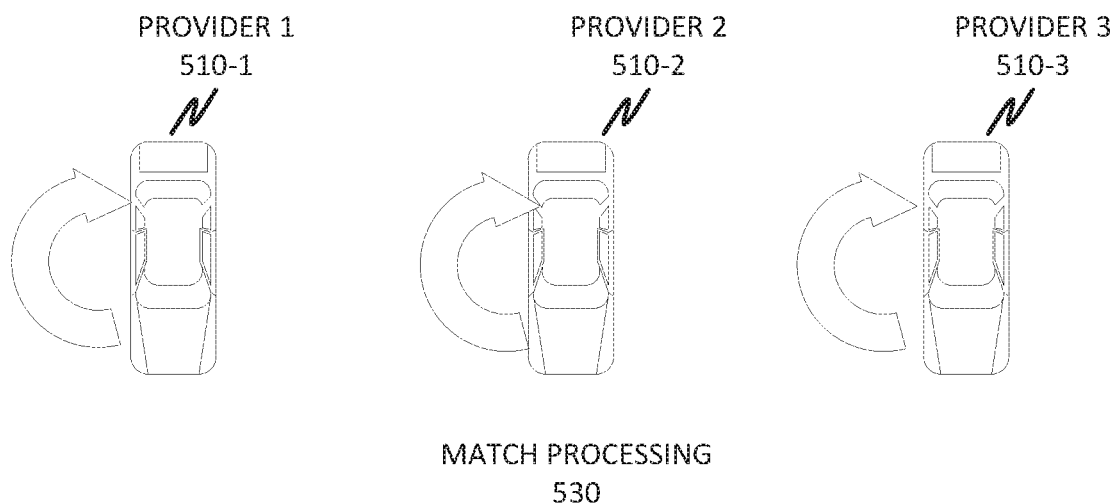
Figure 5B:
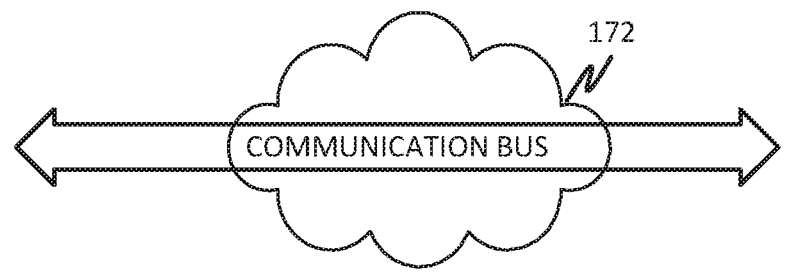

Turning to FIG. 5B, after receiving encrypted service request 520, each provider 510 performs match processing 530. Match processing 530 may include, for example, analyzing encrypted service request 520 within an enclave 440 running a service selection engine 224. At this stage, service selection engine 224 does not reveal to providers 510 the contents of encrypted service request 520. Rather, service selection engine 224 simply performs its matching function to determine whether each provider 510 is available to provide services according to encrypted service request 520.

Figure 5C:
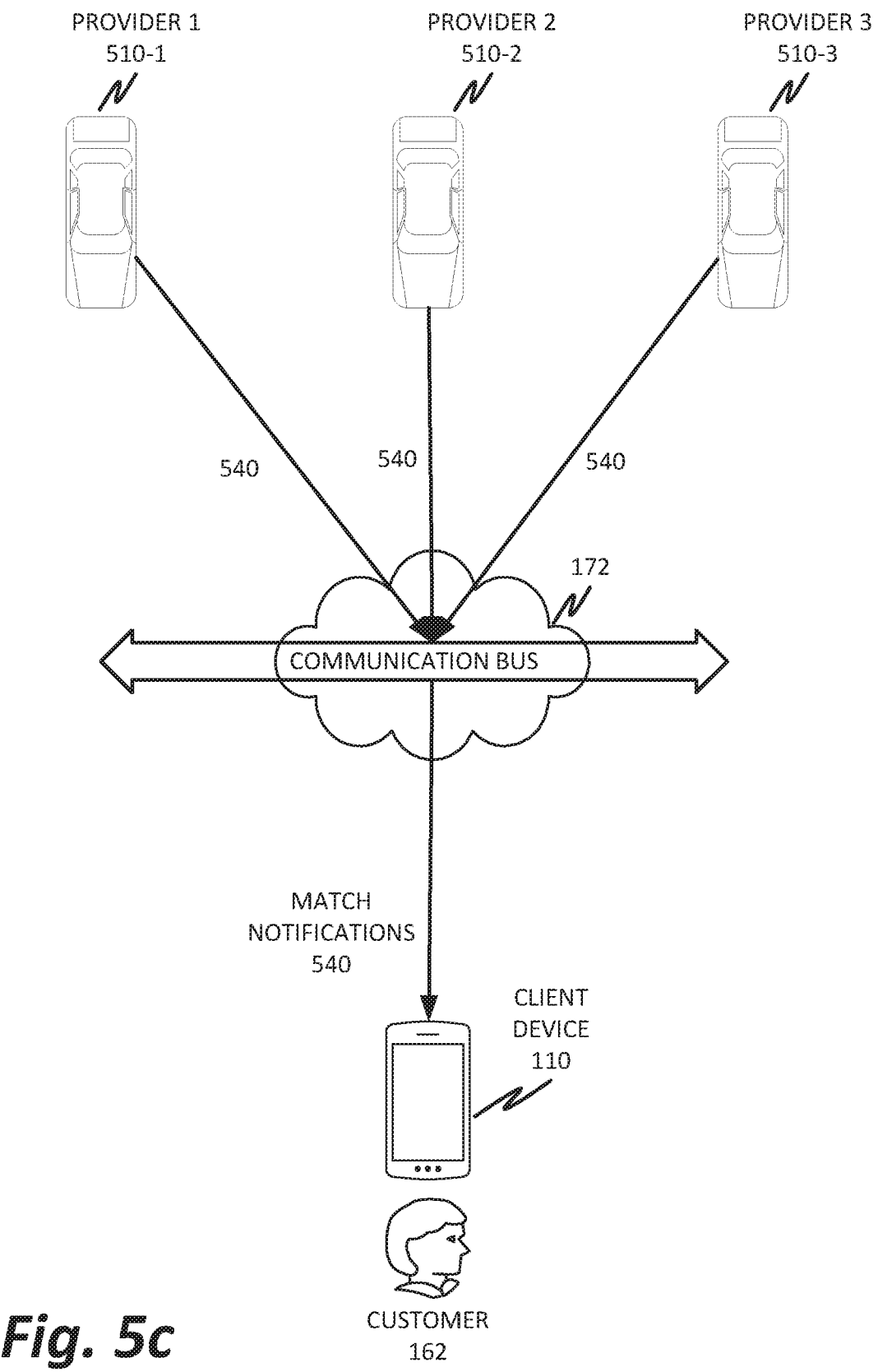

Turning to FIG. 5C, in this example, each provider 510 determines that it is capable of servicing encrypted service request 520. Thus, transparently to providers 510, and without disclosing any data to providers 510, service selection engine 224 sends a match notification 540 via communication bus 172. In this case, provider 1 510-1 sends match notification 540-1. Provider 2 510-2 sends match notification 540-2. Provider 3 510-3 sends match notification 540-3. Consumer 162 receives all three match notifications 540 via client device 110.

Figure 5D:
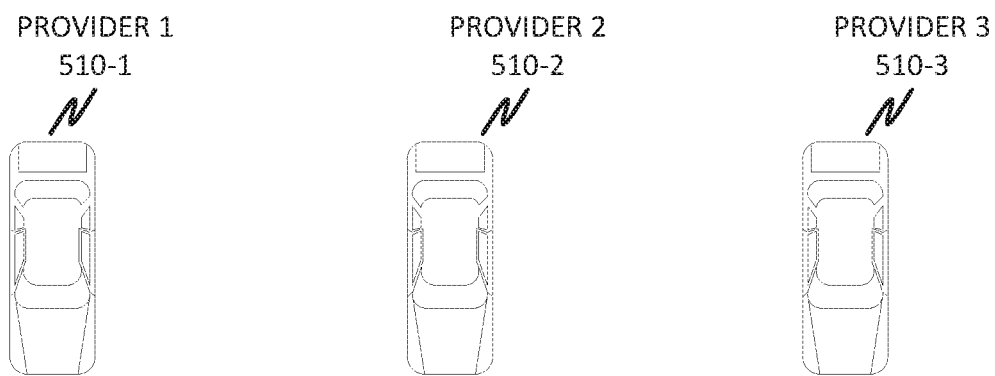
Figure 5D:
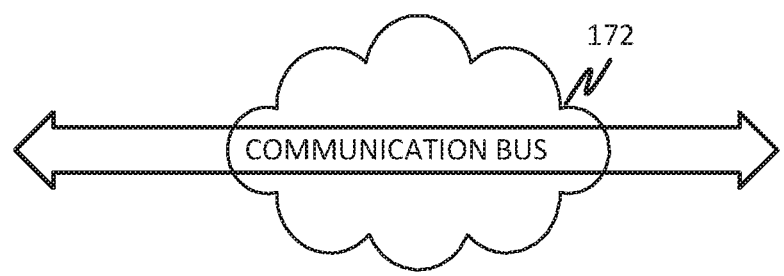
Figure 5D:
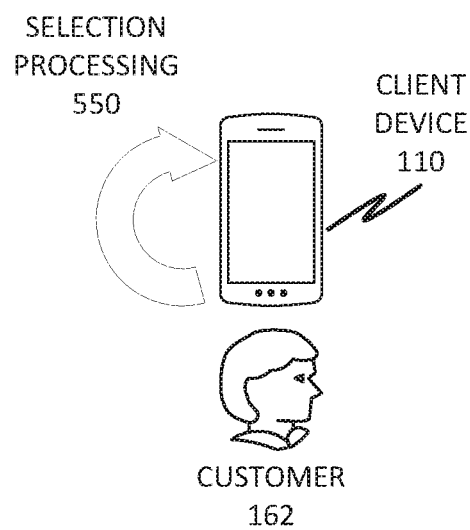

Turning to FIG. 5D, client device 110 of consumer 162 performs selection processing 550 within its own service selection engine 224. This includes, for example, matching consumer 162's stated preferences against match notifications 540. Service selection engine 224 then provides identifies a best match for consumer 162.

Figure 5E:
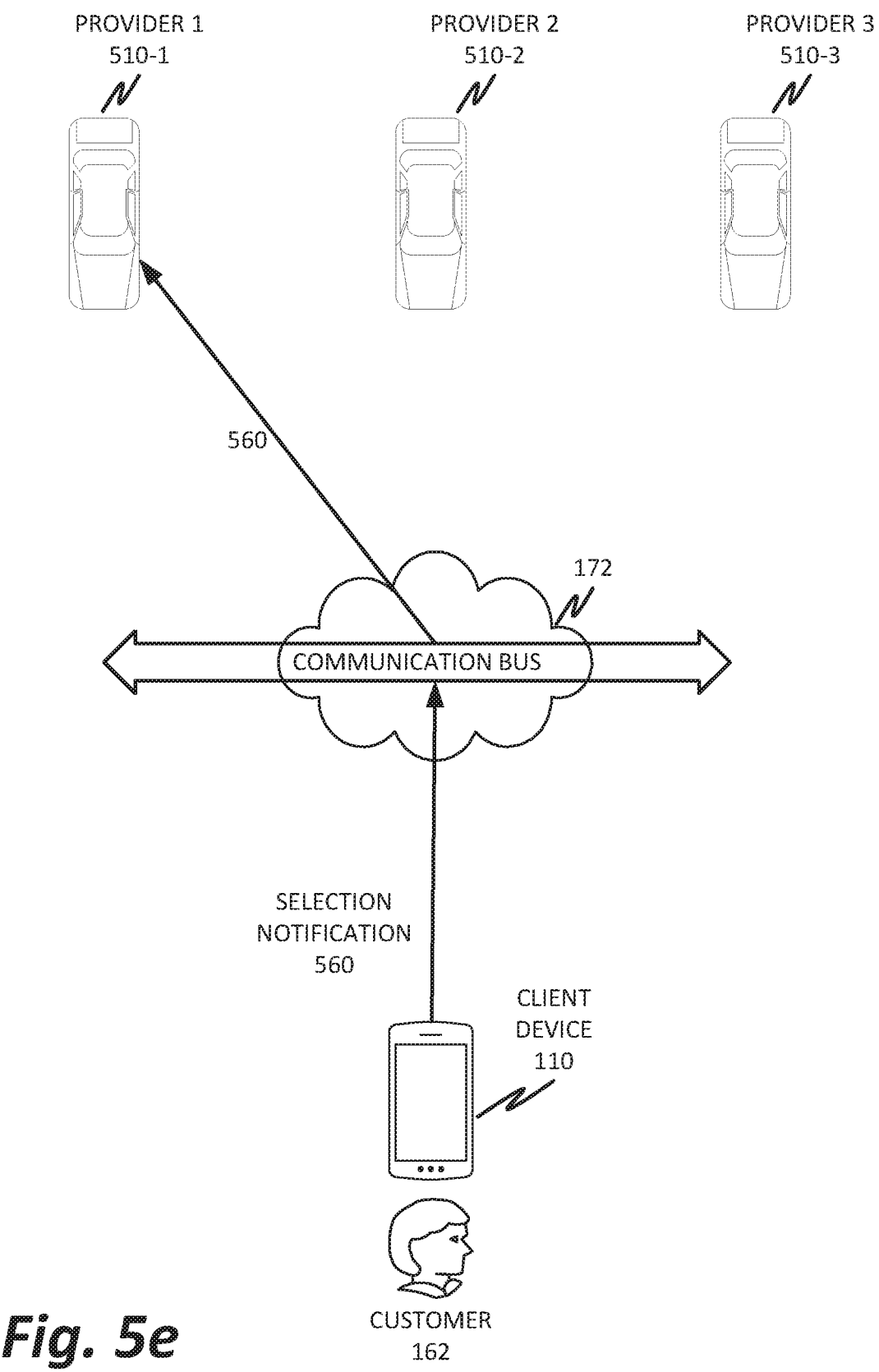

Turning to FIG. 5E, client device 110 sends a selection notification 560 via communication bus 172 to provider 1 510-1, indicating that provider 1 510-1 has been selected as the best match. Client device 110 may send selection notification 560 without any additional input from consumer 162, or indeed without even notifying consumer 162 which provider 510 has been selected. In other words, up to this point of the transaction, the only explicit user action taken in one example is that consumer 162 requested a particular service via client device 110. All additional negotiation up to this point has been performed automatically by client devices 110, transparently to all users.

Figure 5F:
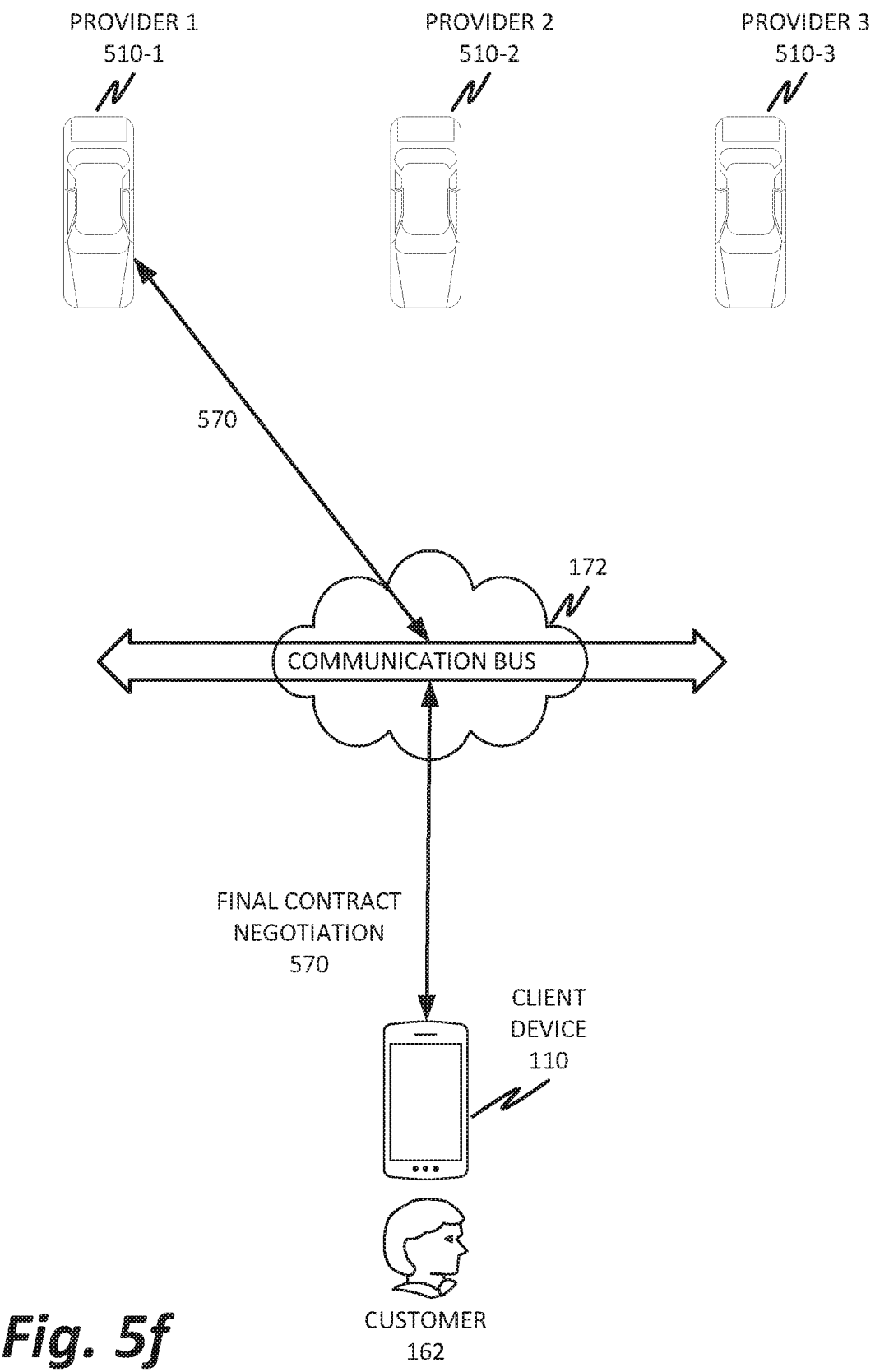

Turning to FIG. 5F, consumer 162 and provider 1 510-1 may now perform final contract negotiations 570 interactively via communication bus 172. It should be recognized that in this case, final contract negotiations 570 may be performed automatically via client devices 110, or in person between consumer 162 and provider 1 510-1. Depending on the context, in this example, final contract negotiations 570 may include a face-to-face meeting between consumer 162 and provider 1 510-1, in which case communication bus 172 is simply the two individuals physically meeting.

In some cases, final contract negotiations 570 may include the exchange of explicit tokens, such as electronic tokens, which enable the exposure of certain selected data.

Figure 5G:
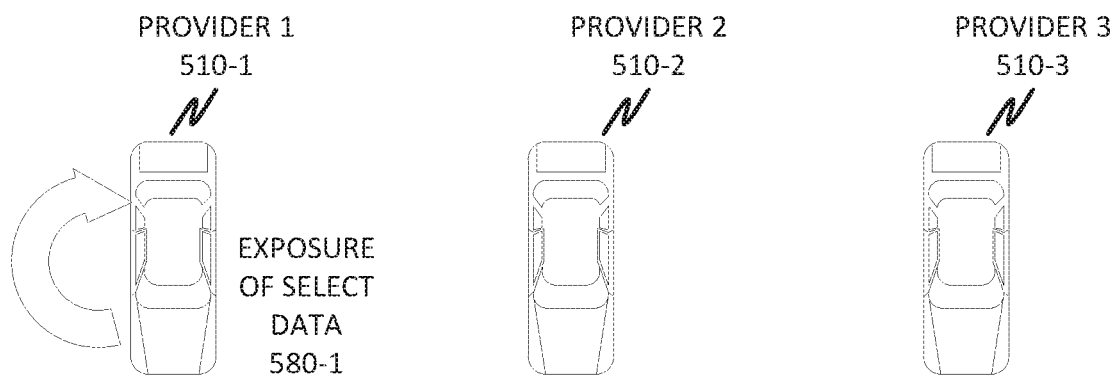
Figure 5G:
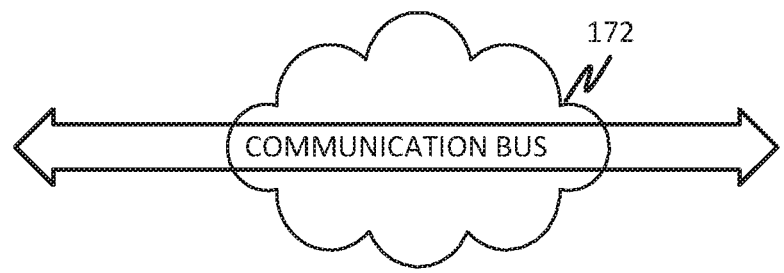
Figure 5G:
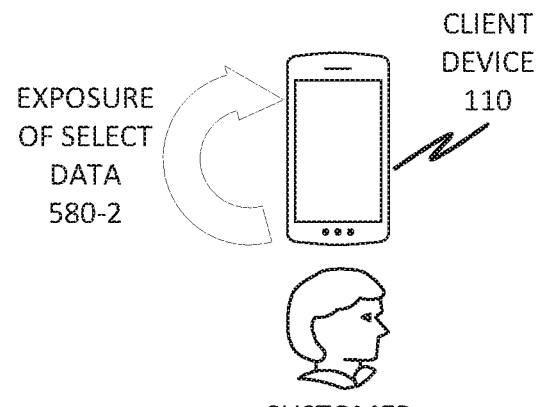

Turning to FIG. 5G, service selection engines 224 on client devices 110 operated by both consumer 162 and provider 1 510-1 perform exposure of select data 580. Specifically, exposure of select data 580-1 comprises exposure of data from consumer 162 to provider 1 510-1. Exposure of select data 580-2 comprises exposure of select data from provider 1 510-1 to consumer 162.

Encrypted service request 520, encrypted match notification 540, and encrypted selection notification 560 are all species of encrypted payloads. A zero knowledge proof engine or other service selection engine may be configured to operate on an encrypted payload and make decisions about the encrypted payload with little or no additional interaction with an end user, and without disclosing data to the end user.

Figure 6:
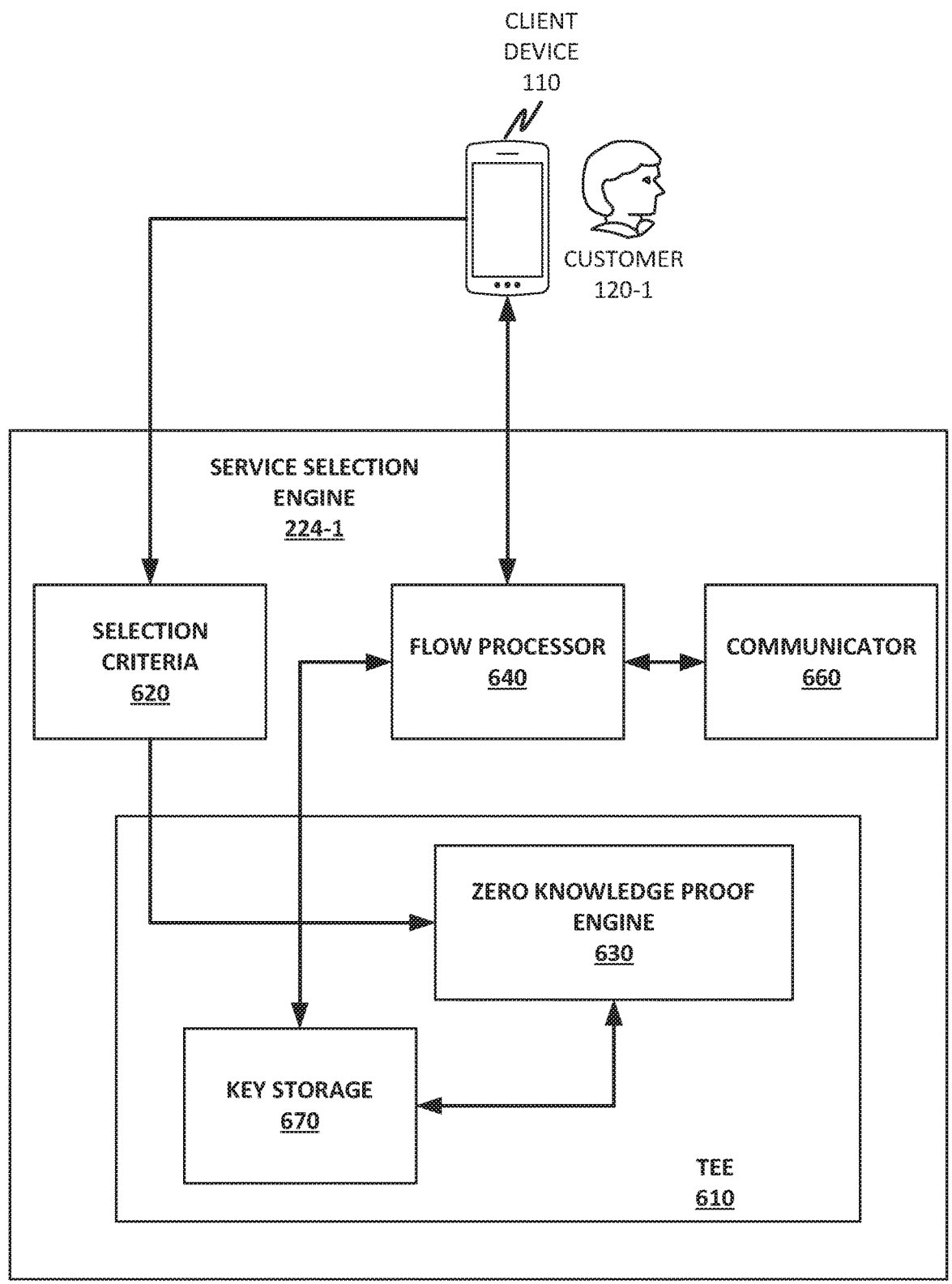
FIG. 6 is a block diagram of a client device operated by a consumer according to one or more examples of the present specification.

FIG. 6 is a block diagram of a service selection engine 224-1 of a client device 110-1 operated by consumer 162.

It should be noted in this example that service selection engine 224-1 includes both hardware and software elements that work together to perform the method. In this example, client device 110-1 may be operated by consumer 162, and as illustrated in FIG. 2, may include a number of peripherals that enable consumer 162 to provide inputs and receive outputs on client device 110-1.

Service selection engine 224-1 includes a flow processor 640, a communicator 660, selection criteria 620, and a trusted execution environment (TEE) 610. By way of non-limiting example, TEE 610 may include a zero knowledge proof engine 630 and a key storage 670.

Flow processor 640 may be a standard processor performing ordinary unencrypted processor services. For example, flow processor 640 may be processor 220 of FIG. 2. It should be understood the TEE 610 also may use processor 220, and that both TEE 610 and flow processor 640 may be provided by the same identical processor. In that case, TEE 610 may be provided by special instructions within processor 220. These may include, by way of nonlimiting example, SGX instructions provided in contemporary Intel processors. Thus, in certain examples, it may be understood that flow processor 640 and TEE 610 represent a logical division of function rather than necessarily different hardware devices.

Flow processor 640 communicatively couples to communication bus 172 via communicator 660. Communicator 660 may be, for example, network interface 260 of FIG. 2. Thus, when service selection engine 224 communicates with a second service selection engine on a separate device or with a service management engine, or any other device, this may comprise sending one or more data packets via communicator 660, and receiving zero or more data packets in response via communicator 660. It should be understood that it is not intended for communicator 660 to be limited to any particular protocol or physical configuration. IPv4 communication is provided in this specification by way of example, but many other communication media and methods are available. Indeed, as described herein, at certain stages, communication according to this method may take place in person or over the telephone. Thus, it is intended that the communication methods disclosed in this specification be broadly read to include any suitable communication method.

In this example, flow processor 660 is provided to perform nonsecure actions, such as those actions taken outside of enclave 440 or TEE 610. For example, when consumer 162 requests a service via encrypted service request, flow processor 640 may encrypt the request itself, or may provide the packet with sensitive user data to TEE 610 so that TEE 610 can encrypt the package and sign it with a key unique to TEE 610.

Flow processor 640 may include, within encrypted service request 520, data received from consumer 162 via client device 110. This may include, for example, the fact that the user is requesting service, and details such as when where and how the service is required. In certain examples, these may be input specially with each request, or may include stored data including user preferences. In some examples, the request may include a combination of stored data and one-time user input.

Flow processor 640 may also be configured to receive via communicator 660 match notifications 540, though flow processor 640 itself may not be able to decipher match notifications 540. Rather, upon receiving match notifications 540, flow processor 640 may forward them to zero knowledge proof engine 630 of TEE 610. Flow processor 640 may then await a selection notification 560 from zero knowledge proof engine 630, and upon receiving it may forward it via communicator 660. Selection notification 560 may be informed by selection criteria 620, which may be provided by consumer 162 in advance and stored in a non-encrypted memory on client device 110.

TEE 610 may also include a key storage 670 which may store a private key for TEE 610, which it may use to digitally sign outputs, and may also include a public key provided by other devices, which it may use to decrypt inputs received from those devices. The use of public and private key pairs is provided by way of nonlimiting example, and other encryption schemes are possible, such as symmetric encryption, one-time pads, or other suitable encryption types. Any such decryption tokens may be provided and stored within key storage 670. Any suitable mechanism may be used to update and manage the key storage 670, for example, a PKI-based infrastructure.

Figure 7:
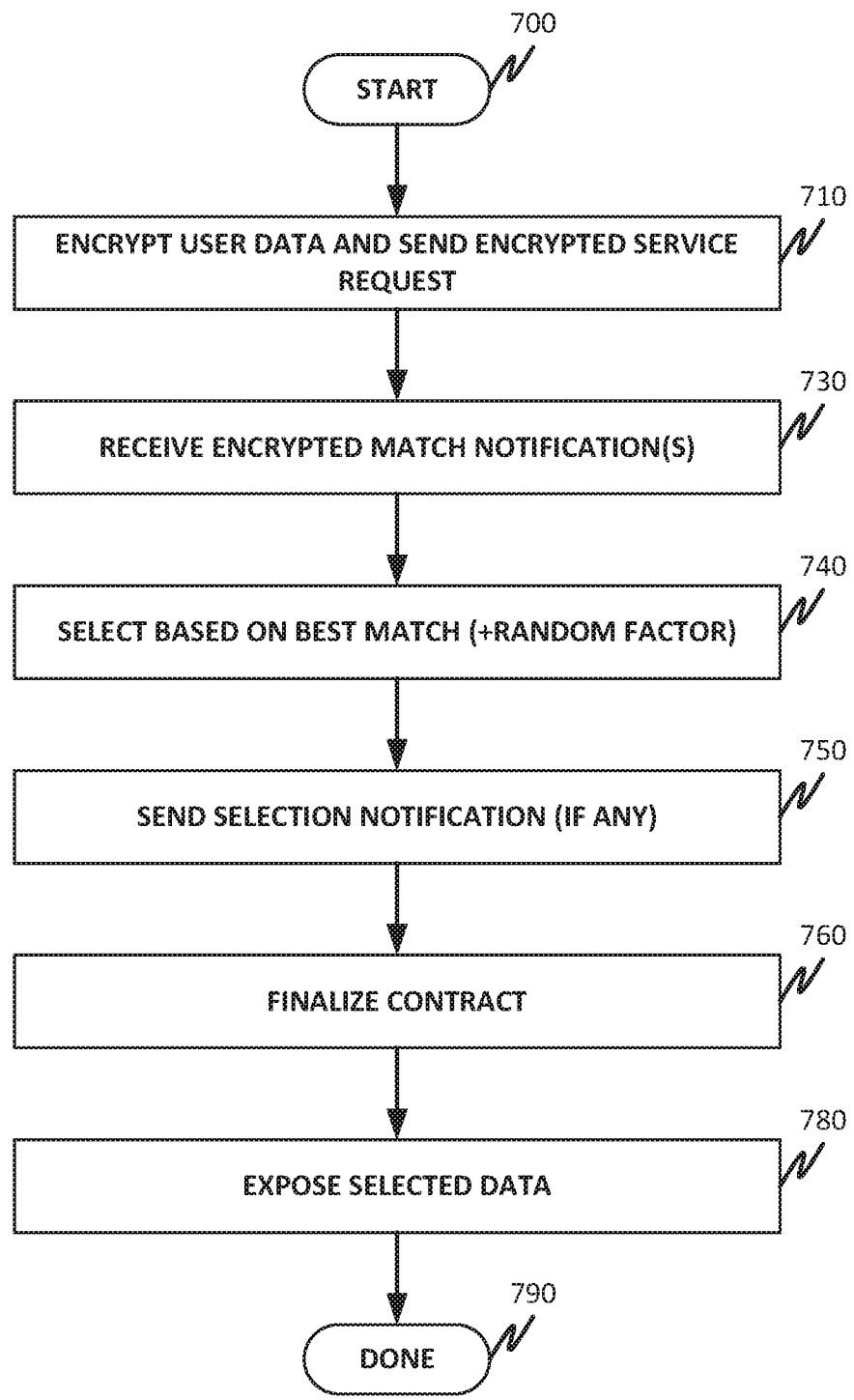
FIG. 7 is a flow chart of a method performed by a client device according to one or more examples of the present specification.

FIG. 7 is a flowchart of a method 700 performed by client device 110-1 (FIG. 6) operated by consumer 162 according to one or more examples of the present specification.

In block 710, flow processor 640 encrypts user data and sends encrypted service request 520 via communicator 660. It should be noted that in some cases, encrypting the encrypted service request may include interoperation with TEE 610 and zero knowledge proof engine 630. One example is pre-shared symmetrical key or asymmetrical keys for encryption and decryption.

After waiting a suitable time, which may include a user-selectable time limit for receiving a plurality of responses, flow processor 640 receives zero or more encrypted match notifications. If no match notifications are received, then the service is not available. However, if at least one match notification is received then the process may proceed to block 740.

In block 740, flow processor 640 provides the one or more match notifications 540 to zero knowledge proof engine 630 of TEE 610. TEE 610 may use encryption tokens within key storage 670 to internally decrypt match notifications 540. Zero knowledge proof engine 630 may then compare selection criteria 620 to data provided within the encrypted match notifications 540.

In block 740, zero knowledge proof engine 630 selects the best match based on selection criteria 620. If more than one match notification 540 meets the minimum requirements of these selection criteria, and no additional criteria are available or necessary for making a selection, then a random or pseudorandom factor may also be applied to select between a plurality of best match notifications.

In block 750, zero knowledge proof engine 630 provides a selection notification 560, if any, to flow processor 640. Flow processor 640 then sends the selection notification 560 via communicator 660.

In block 760, consumer 162 and provider 510 may perform final contract negotiations, either one way or interactively, and either automatically or via a human interaction.

Only once the contract is finalized does zero knowledge proof engine 630, in block 780, expose selected data as necessary to consumer 162. It should be noted that the data exposed to consumer 162 are only those data necessary for consumer 162 to perform his necessary function in the transaction. Thus, even after the contract has been finalized, zero knowledge proof engine 630 may not expose to user 162 all data that were used to perform the selection.

In some examples, consumer 162 may also provide feedback to zero knowledge proof engine 630 about the quality of it selection. This feedback may include specific details of what consumer 162 liked or did not like about the selection. Zero knowledge proof engine 630 may use the feedback to improve future selections.

In block 790, the method is done.

Figure 8:
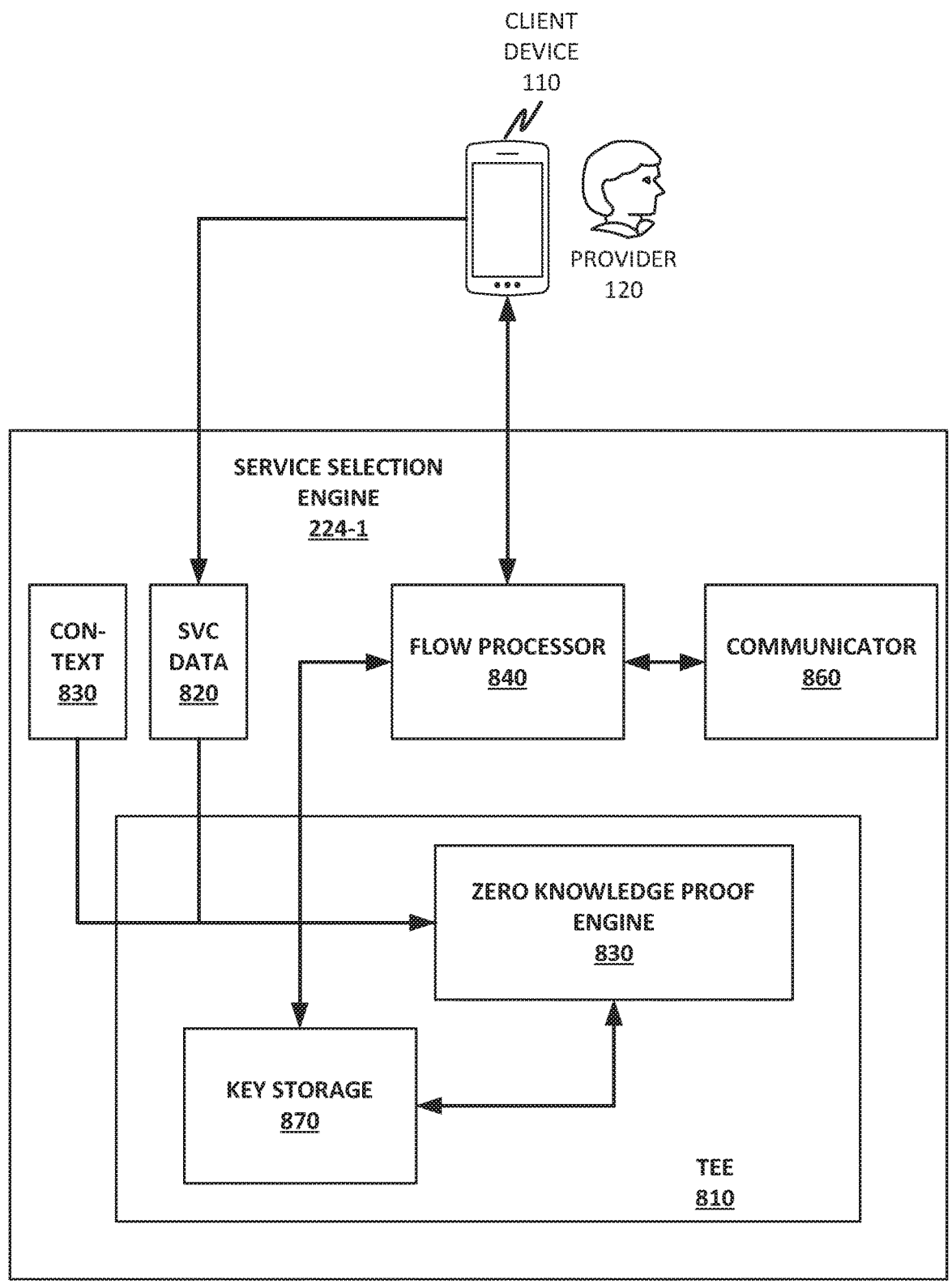
FIG. 8 is a block diagram of a client device operated by a service provider according to one or more examples of the present specification.

FIG. 8 is a block diagram of a service selection engine 224-2 operated by provider 510 on client device 110-2. It should be noted that service selection engine 224-2 is similar but not identical to service selection engine 224-1. Indeed, in certain embodiments, service selection 224-1 and service selection engine 224-2 may be provided by an identical software package in which simple user inputs are used to specify the role of these specific service selection engines as either a consumer or provider. In other examples, service selection engine 224-1 and 224-2 may be provided by different software packages that nevertheless perform similar functions.

Similar to service selection engine 224-1 of FIG. 6, service selection engine 224-2 includes a flow processor 840, a communicator 860, a TEE 810 including a zero knowledge proof engine 830 and key storage 870, and inputs such as local context 830 and service data 820. In this example, flow processor 840 and communicator 860 perform substantially similar or identical functions to their counterparts in FIG. 6. Similarly, zero knowledge proof engine 830 and key storage 870 provide nearly identical services to their counterparts in FIG. 6, although in this context they perform the role of a provider 510 rather than a consumer 162.

Local context 830 may include static or real-time contextual data that may influence the ability of provider 510 to service a particular request. For example, if a taxi service is provided, context 830 may include an input from a GPS receiver, indicating where a particular taxi is at a given time. Depending on his or her location, provider 510 may or may not be able to service a particular request. Decisions informed by context 830 may go beyond simple Boolean "yes" or "no" decisions, and may indicate the desirability of servicing a particular request. For example, if provider 510 is operating a taxi two miles away from the consumer's pickup location, this may be considered a highly desirable fare because the consumer is very close. On the other hand, if provider 510 is 10 miles away, it may be possible to service a request for 20 minutes from now, but may be less desirable than if the consumer were much closer. Context may also include inputs such as traffic conditions, speed limits on the fastest route to the pickup location, road conditions, and other similar factors. Thus, based on context 830, a sliding scale may be defined for desirability of servicing a particular encrypted service request 520. As with consumer 162, provider 510 may provide feedback after the fact to "train" service selection engine 240-1 224-2 for making better future decisions.

Service data 820 may include information such as tariffs, fees, fares, operating costs, profit margins, and other business realities that affect the ability and desirability of provider 510 servicing a particular encrypted service request 520.

Figure 9:
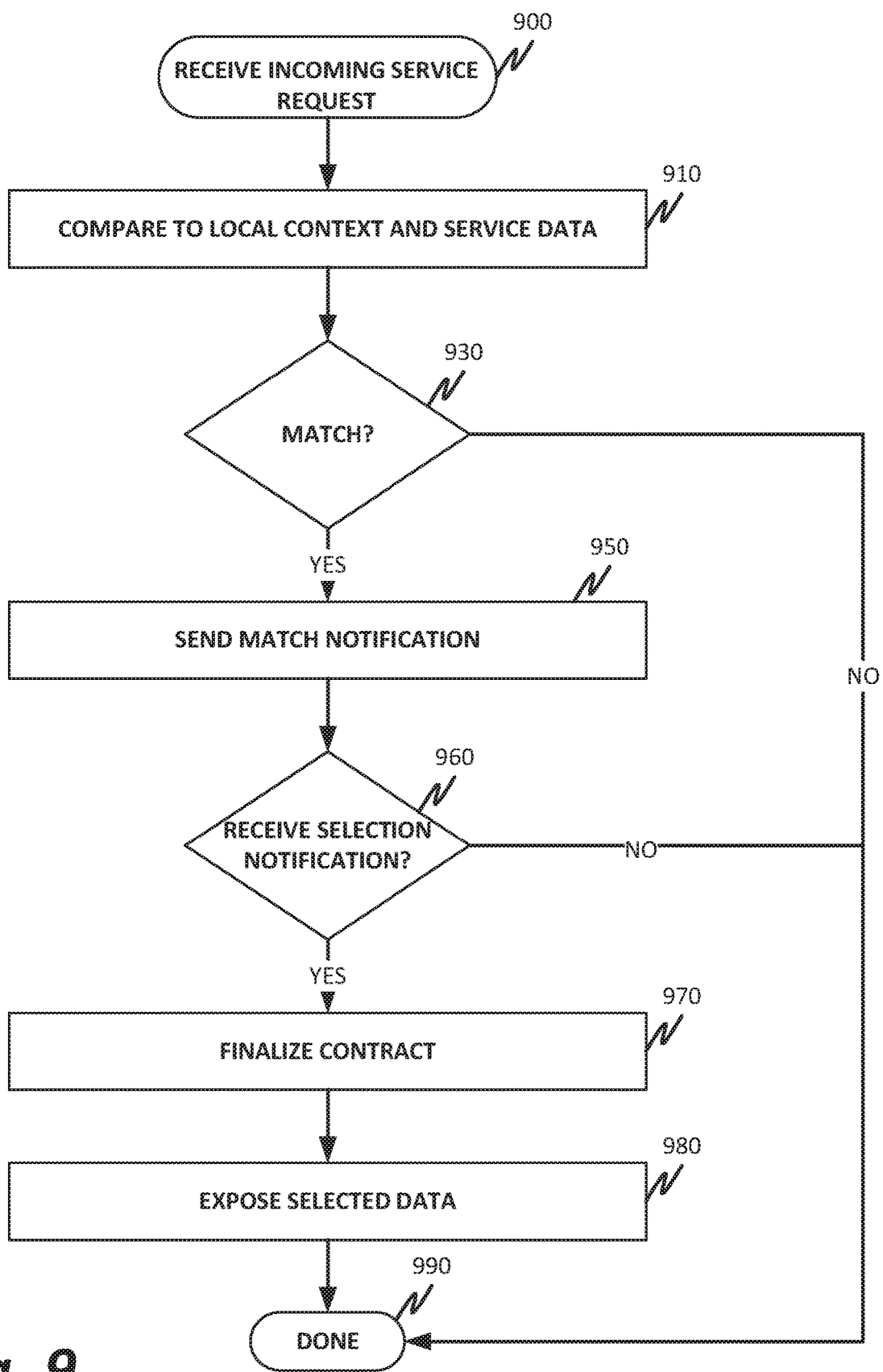
FIG. 9 is a flow chart of a method performed by a client device according to one or more examples of the present specification.

FIG. 9 is a flowchart of a method performed by service selection engine 224-2 operated by provider 510 according to one or more examples of the present specification.

In block 900, service selection engine 224-2 receives an incoming service request 520.

In block 910, flow processor 840 provides the service request to zero knowledge proof engine 830. Zero knowledge proof engine 830 then compares the incoming encrypted service request 520 to context 830 and service data 820. Zero knowledge proof engine 830 may then make the decision about whether to send a match notification 540. This may be either a Boolean decision, or may be on a sliding scale. In this example, there may be some limited input/output operation with provider 510. For example, service selection engine 224-2 may make a match selection on a sliding scale between 0 and 100%. If the selection score is above a threshold, for example 60%, flow processor 840 may receive only the bare score, and may query provider 510 on whether he or she is willing to accept a service request with a 60% match score. Provider 510 may then decide whether to accept the service request. The threshold for providing a query may be user configurable. For example, provider 510 may instruct service selection engine 224-2 to query for matches between 60% and 80%, and to automatically accept all matches over 80%. Alternatively, provider 510 may instruct service selection engine 224-2 to provide match notifications 540 only if the selection score is above 80%. In another example, provider 510 may instruct service selection engine 224-2 to accept 50% of service requests with a match score between 60 and 80%, and 100% of request from 81% and above. Many other combinations and configurations are possible, and the broad scope of this specification is included to encompass any suitable combination of scores and inputs.

In decision block 930, if zero knowledge proof engine 830 indicates no match, either with or without input from provider 510, then in block 990 the method is done. However, if a match is indicated, then in block 950, flow processor 840 sends an encrypted match notification 540 via communicator 860.

In decision block 960, flow processor 840 waits, for example for a specified and selectable time, for a match notification. If no match notification is received within that time, then in block 990, the method is done. However, if they selection notification is received, then in block 970, provider 510 negotiates with consumer 162 to finalize the contract.

In block 980, zero knowledge proof engine 830 exposes to provider 510 via flow processor 840 selected data about consumer 162. As before, this may include less than all of the data that zero knowledge proof engine 830 used to perform matching and selection.

In block 990, the method is done.

Figure 10:
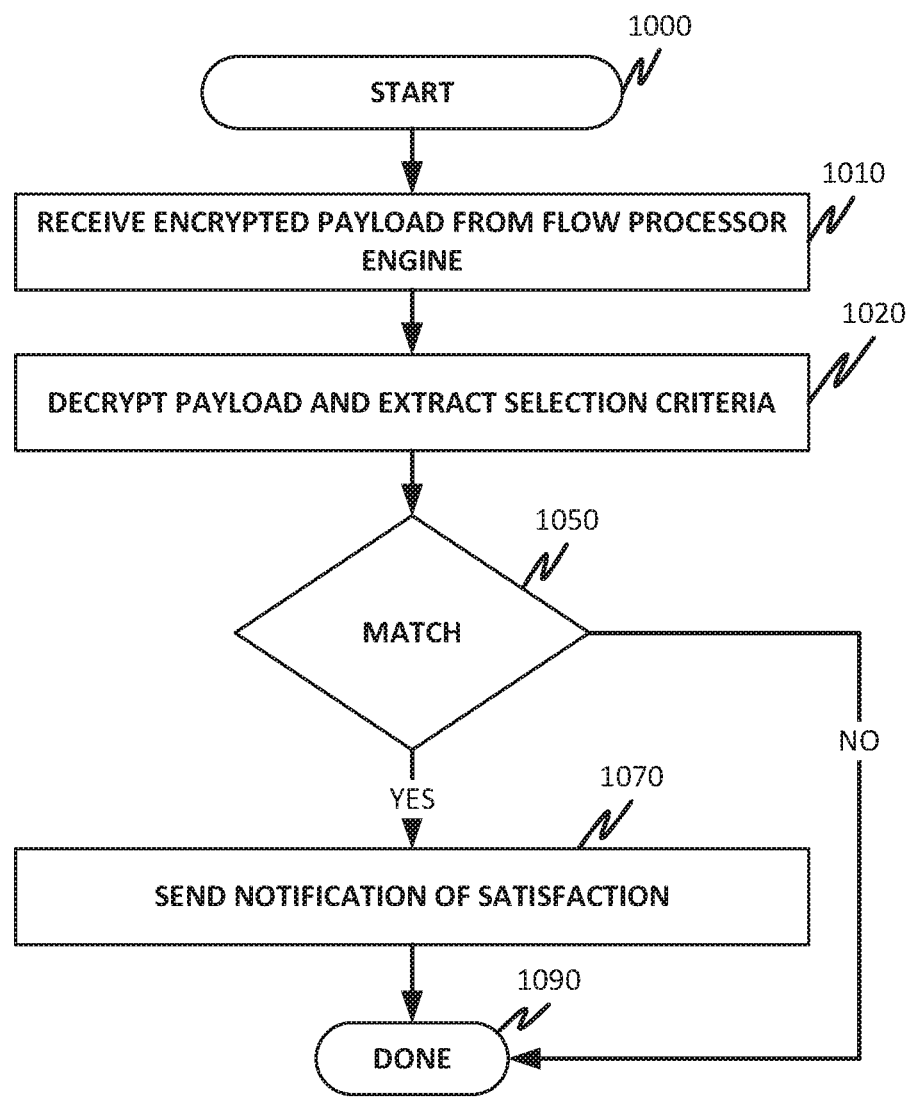
FIG. 10 is a block diagram of a generic method encompassing embodiments of the methods of FIGS. 6 and 9 according to one or more examples of the present specification.

FIG. 10 is a block diagram of a generic method 1000 encompassing embodiments of the methods of FIGS. 6 and 9 according to one or more examples of the present specification. It should be noted, however, that the method of FIG. 10 is not limited to embodiments disclosed in FIGS. 6 and 9.

Starting from block 1000, in block 1010, TEE 610 or 810 receives from flow processor 640 or 840 an encrypted payload. This may be, for example, an encrypted service request 520 or match notification 540, or any other suitable encrypted payload.

In block 1020, TEE 610 or 810 decrypts the encrypted payload, and extracts selection criteria. The selection criteria may include, for example, selection criteria 620 of FIG. 6, or context 830 and service data 820 of FIG. 8, or any other suitable selection criteria.

Decision block 1050 is a check for whether there is a match between the selection criteria of block 1020 and the encrypted payload of block 1010.

If there is a match, then in block 1070, TEE 610 or 810 sends a notification of satisfaction. This may be, for example, the selection notification of block 750 (FIG. 7) or match notification of block 950 (FIG. 9).

If there is no match, then in block 1090, the method is done.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in one example a computing apparatus to broker purchase of an item or service between a consumer and seller, comprising: a hardware platform comprising a processor; and a memory, comprising executable instructions to instruct the hardware platform to: receive an encrypted payload comprising a request from a consumer to purchase the item or service, the encrypted payload including information about the consumer; without exposing the information about the consumer to the seller, determine, based on the seller's availability to sell the item or service and the seller's preferences for selling the item or service, that the request matches the seller's availability and preferences; and send a notification that the seller will sell the item or service.

There is further disclosed a computing apparatus, wherein the memory comprises a local context store comprising descriptors of the seller's availability.

There is further disclosed a computing apparatus, wherein the memory comprises a service data store comprising data on the seller's preferences.

There is further disclosed a computing apparatus, wherein the instructions are further to instruct the hardware platform to receive a selection notification to indicate that the consumer intends to complete the sale, and to expose to the seller sufficient information about the consumer to complete the sale.

There is further disclosed a computing apparatus, further comprising a trusted execution environment (TEE), wherein the TEE is configured to provide an integrity verification token.

There is further disclosed a computing apparatus, wherein the instructions are further to instruct the hardware platform to: receive sensitive user data for a user of the computing apparatus; encrypt the sensitive user data into an encrypted request; and send the encrypted request via a communicator; wherein the encrypted payload is a service availability notification.

There is further disclosed a computing apparatus, wherein the instructions are further to instruct the processor to determine that the service availability notification satisfies at least one selection criterion.

There are also disclosed one or more tangible, non-transitory computer-readable mediums having stored thereon executable instructions to instruct a processor to: receive an encrypted payload comprising a request from a consumer to purchase an item or service, the encrypted payload including information about the consumer; receive a seller's availability to sell the item or service; receive the seller's preferences for selling the item or service; without exposing the information about the consumer to the seller, determine that the request matches the seller's availability and preferences; and send a notification that the seller will sell the item or service.

There are further disclosed one or more tangible, non-transitory computer-readable mediums, wherein the instructions are further to instruct the processor to allocate a local context store comprising descriptors of the seller's availability.

There are further disclosed one or more tangible, non-transitory computer-readable mediums, wherein the instructions are further to instruct the processor to allocate a service data store comprising data on the seller's preferences.

There are further disclosed one or more tangible, non-transitory computer-readable mediums, wherein the instructions are further to instruct the processor to receive a selection notification to indicate that the consumer intends to complete the sale, and to expose to the seller sufficient information about the consumer to complete the sale.

There are further disclosed one or more tangible, non-transitory computer-readable mediums, wherein the instructions are further to instruct the processor to allocate a trusted execution environment (TEE), wherein the TEE is configured to provide an integrity verification token.

There are further disclosed one or more tangible, non-transitory computer-readable mediums, wherein the instructions are further to instruct the processor to: receive sensitive user data for a user of the computing apparatus; encrypt the sensitive user data into an encrypted request; and send the encrypted request via a communicator; wherein the encrypted payload is a service availability notification.

There are further disclosed one or more tangible, non-transitory computer-readable mediums, wherein the instructions are further to instruct the processor to determine that the service availability notification satisfies at least one selection criterion.

There is also disclosed a computer-implemented method of brokering the purchase or the sale of an item or service between a seller and a consumer, comprising: receiving an encrypted payload comprising a request to purchase the item or service, the encrypted payload including information about the consumer; determining the seller's availability to sell the item or service; determining the seller's preferences for selling the item or service; without exposing the information about the consumer to the seller, determining that the seller is available and willing to sell the item or service; and sending to the consumer a notification that the seller will sell the item or service.

There is further disclosed a method, further comprising allocating a local context store comprising descriptors of the seller's availability.

There is further disclosed a method, further comprising allocating a service data store comprising data on the seller's preferences.

There is further disclosed a method, further comprising receiving a selection notification to indicate that the consumer intends to complete the sale, and exposing to the seller sufficient information about the consumer to complete the sale.

There is further disclosed a method, further comprising allocating a trusted execution environment (TEE), wherein the TEE is configured to provide an integrity verification token.

There is further disclosed a method, further comprising: receiving sensitive user data for a user of the computing apparatus; encrypting the sensitive user data into an encrypted request; and sending the encrypted request via a communicator, wherein the encrypted payload is a service availability notification.

What is claimed is:

1. A computing apparatus to broker purchase of an item or service between a consumer and a seller, comprising:
    a hardware platform comprising a processor; and
    a memory, comprising executable instructions to instruct the hardware platform to:
        receive an encrypted payload comprising a request from the consumer to purchase the item or service, the encrypted payload including information about the consumer;
        without exposing any identifying information about the consumer to the seller, determine, based on the seller's availability to sell the item or service and the seller's preferences for selling the item or service, that the request matches the seller's availability and preferences; and
        send a notification that the seller will sell the item or service.

2. The computing apparatus of claim 1, wherein the memory comprises a local context store comprising descriptors of the seller's availability.

3. The computing apparatus of claim 1, wherein the memory comprises a service data store comprising data on the seller's preferences.

4. The computing apparatus of claim 1, wherein the instructions are further to instruct the hardware platform to receive a selection notification to indicate that the consumer intends to complete a sale, and to expose to the seller sufficient information about the consumer to complete the sale.

5. The computing apparatus of claim 1, further comprising a trusted execution environment (TEE), wherein the TEE is configured to provide an integrity verification token.

6. The computing apparatus of claim 1, wherein the instructions are further to instruct the hardware platform to:

receive sensitive user data for a user of the computing apparatus;

encrypt the sensitive user data into an encrypted request; and send the encrypted request via a communicator, wherein the encrypted payload is a service availability notification.

7. The computing apparatus of claim 6, wherein the instructions are further to instruct the processor to determine that the service availability notification satisfies at least one selection criterion.

8. One or more tangible, non-transitory computer-readable mediums having stored thereon executable instructions to instruct a processor to:

receive an encrypted payload comprising a request from a consumer to purchase an item or service, the encrypted payload including information about the consumer;

receive a seller's availability to sell the item or service;

receive the seller's preferences for selling the item or service;

without exposing any identifying information about the consumer to the seller, determine that the request matches the seller's availability and preferences; and send a notification that the seller will sell the item or service.

9. The one or more tangible, non-transitory computer-readable mediums of claim 8, wherein the instructions are further to instruct the processor to allocate a local context store comprising descriptors of the seller's availability.

10. The one or more tangible, non-transitory computer-readable mediums of claim 8, wherein the instructions are further to instruct the processor to allocate a service data store comprising data on the seller's preferences.

11. The one or more tangible, non-transitory computer-readable mediums of claim 8, wherein the instructions are further to instruct the processor to receive a selection notification to indicate that the consumer intends to complete a sale, and to expose to the seller sufficient information about the consumer to complete the sale.

12. The one or more tangible, non-transitory computer-readable mediums of claim 8, wherein the instructions are further to instruct the processor to allocate a trusted execution environment (TEE), wherein the TEE is configured to provide an integrity verification token.

13. The one or more tangible, non-transitory computer-readable mediums of claim 8, wherein the instructions are further to instruct the processor to:

receive sensitive user data for a user of a computing apparatus;

encrypt the sensitive user data into an encrypted request; and send the encrypted request via a communicator, wherein the encrypted payload is a service availability notification.

14. The one or more tangible, non-transitory computer-readable mediums of claim 13, wherein the instructions are further to instruct the processor to determine that the service availability notification satisfies at least one selection criterion.

15. A computer-implemented method of brokering a purchase or a sale of an item or service between a seller and a consumer, comprising:

receiving an encrypted payload comprising a request to purchase the item or service, the encrypted payload including information about the consumer;

determining the seller's availability to sell the item or service;

determining the seller's preferences for selling the item or service;

without exposing any identifying information about the consumer to the seller, determining that the seller is available and willing to sell the item or service; and sending to the consumer a notification that the seller will sell the item or service.

16. The method of claim 15, further comprising allocating a local context store comprising descriptors of the seller's availability.

17. The method of claim 15, further comprising allocating a service data store comprising data on the seller's preferences.

18. The method of claim 15, further comprising receiving a selection notification to indicate that the consumer intends to complete the sale, and exposing to the seller sufficient information about the consumer to complete the sale.

19. The method of claim 15, further comprising allocating a trusted execution environment (TEE), wherein the TEE is configured to provide an integrity verification token.

20. The method of claim 15, further comprising:

receiving sensitive user data for a user of a computing apparatus;

encrypting the sensitive user data into an encrypted request; and sending the encrypted request via a communicator, wherein the encrypted payload is a service availability notification.

* * * * *